United States Patent

Horikoshi et al.

Patent Number: 5,959,978
Date of Patent: *Sep. 28, 1999

[54] METHOD, TERMINAL, AND SYSTEM FOR MULTI-STATION VIDEO COMMUNICATION

[75] Inventors: Hiroki Horikoshi, Kawasaki; Masanori Kawashima, Yokosuka, both of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/425,158

[22] Filed: Apr. 19, 1995

[30] Foreign Application Priority Data

Apr. 21, 1994 [JP] Japan ................................. 6-083365
Apr. 27, 1994 [JP] Japan ................................. 6-089887

[51] Int. Cl.$^6$ ................................................. H04L 12/16
[52] U.S. Cl. ....................... 370/264; 370/263; 340/825.05
[58] Field of Search ......................... 340/825.05; 370/55, 370/62, 85.12, 85.15, 403, 238, 393, 392, 263, 264, 260, 390, 400; 348/15

[56] References Cited

U.S. PATENT DOCUMENTS

| | | |
|---|---|---|
| 4,434,463 | 2/1984 | Quinquis et al. ................. 370/393 |
| 4,573,044 | 2/1986 | McConachie et al. ............ 340/825.05 |
| 4,633,246 | 12/1986 | Jones et al. ..................... 340/825.05 |
| 5,216,670 | 6/1993 | Ofek et al. ........................... 370/403 |
| 5,265,092 | 11/1993 | Soloway et al. ..................... 370/238 |
| 5,287,356 | 2/1994 | Parkhideh ......................... 370/85.12 |
| 5,323,445 | 6/1994 | Nakatsuka ............................. 348/15 |
| 5,526,356 | 6/1996 | Kim et al. ......................... 370/85.15 |

Primary Examiner—Edwin C. Holloway III
Attorney, Agent, or Firm—Fitzpatrick, Cella, Harper & Scinto

[57] ABSTRACT

In a communication system having a plurality of communication terminals connected by a communication circuit in the form of a loop or a bus, data circulated through the communication circuit has a multi-frame structure having a multiplicity of frames in which data fields are assigned to the terminals, and the circulated data is relayed and updated. If all data generated by the terminals is circulated through the communication circuit, each terminal may receive data generated from itself, which is essentially meaningless for the terminal. Data which has become essentially meaningless is deleted during communication to prevent such meaningless data from always occupying a part of the communication circuit to reduce the communication speed and the efficiency of utilization of the communication circuit.

15 Claims, 19 Drawing Sheets

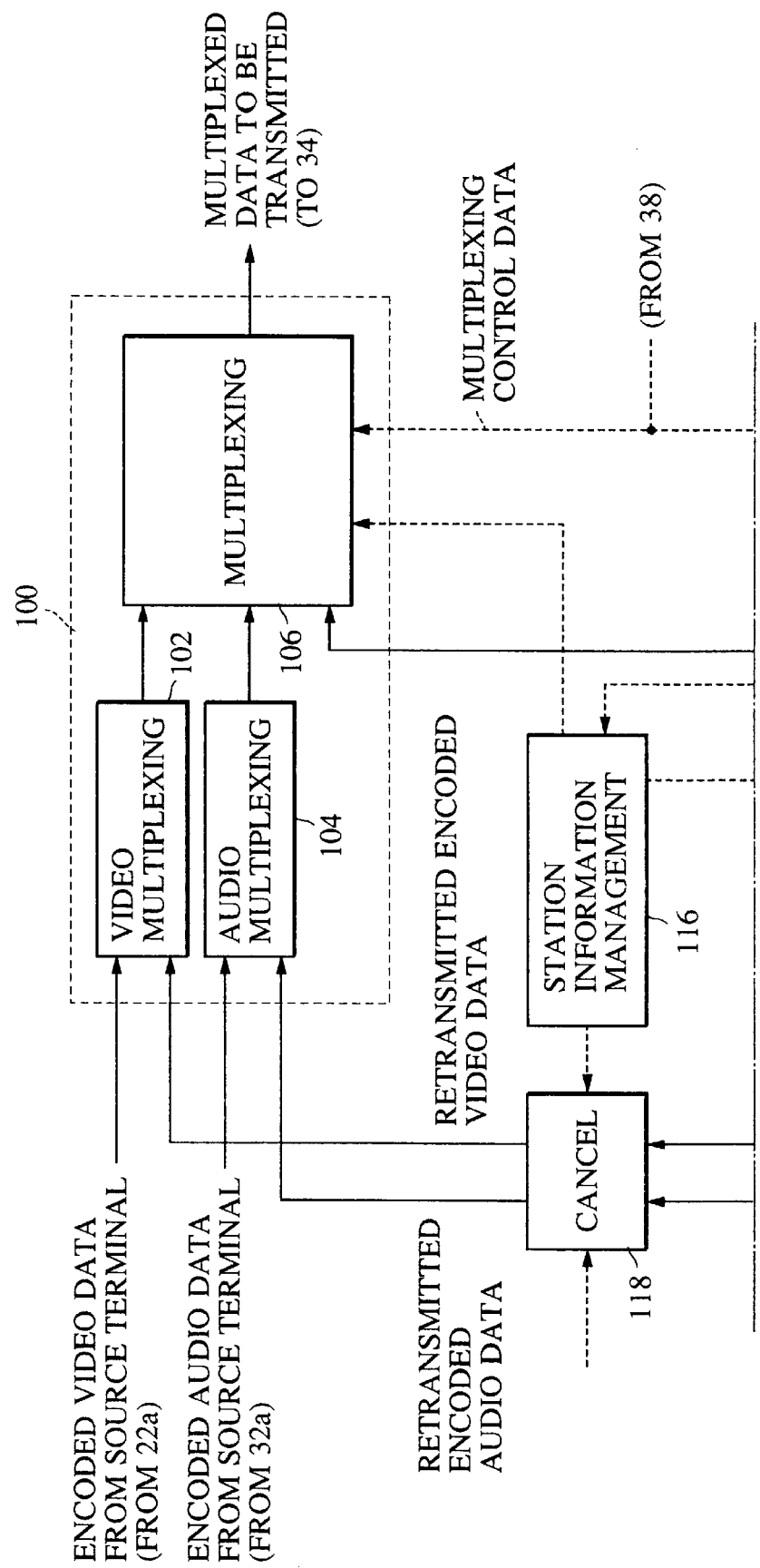

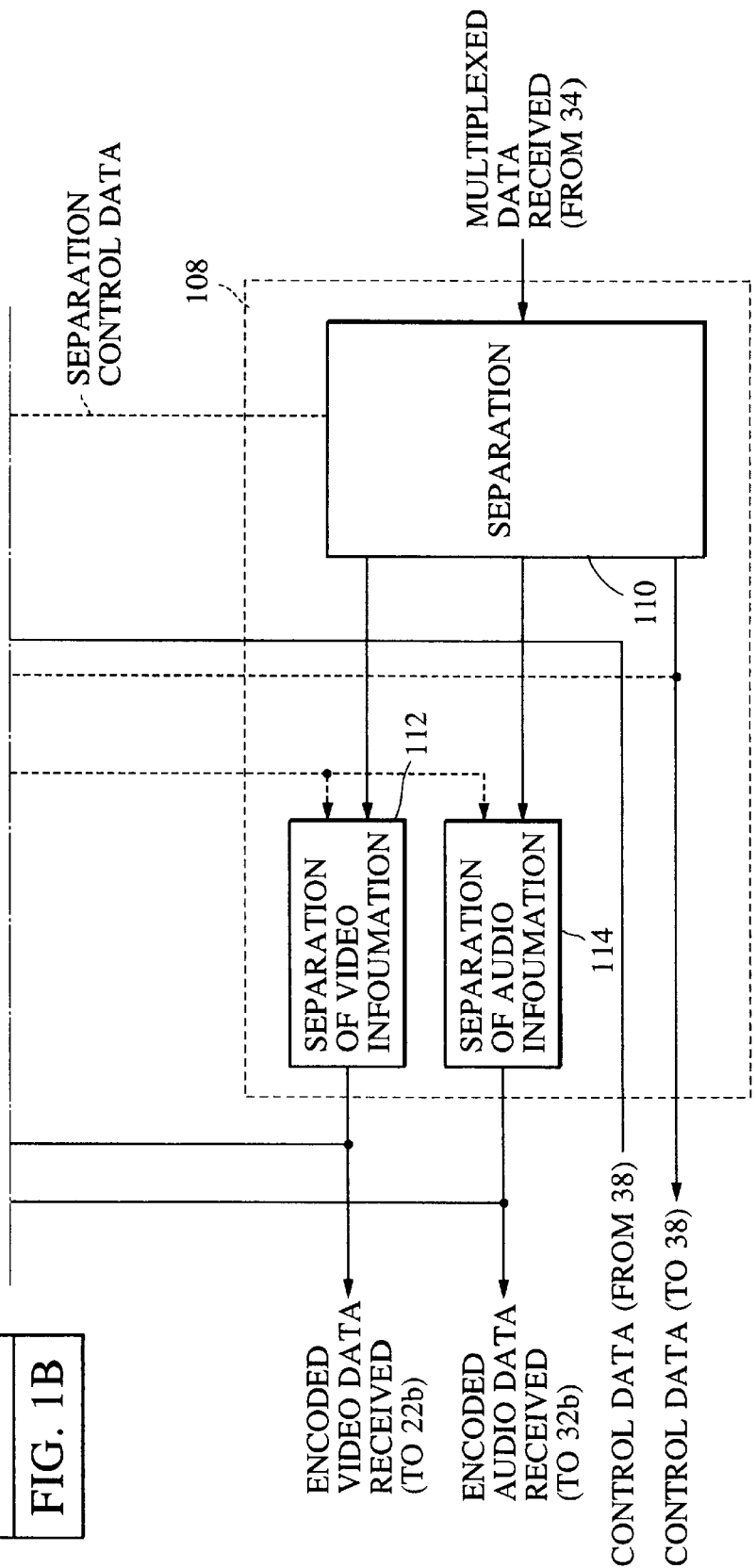

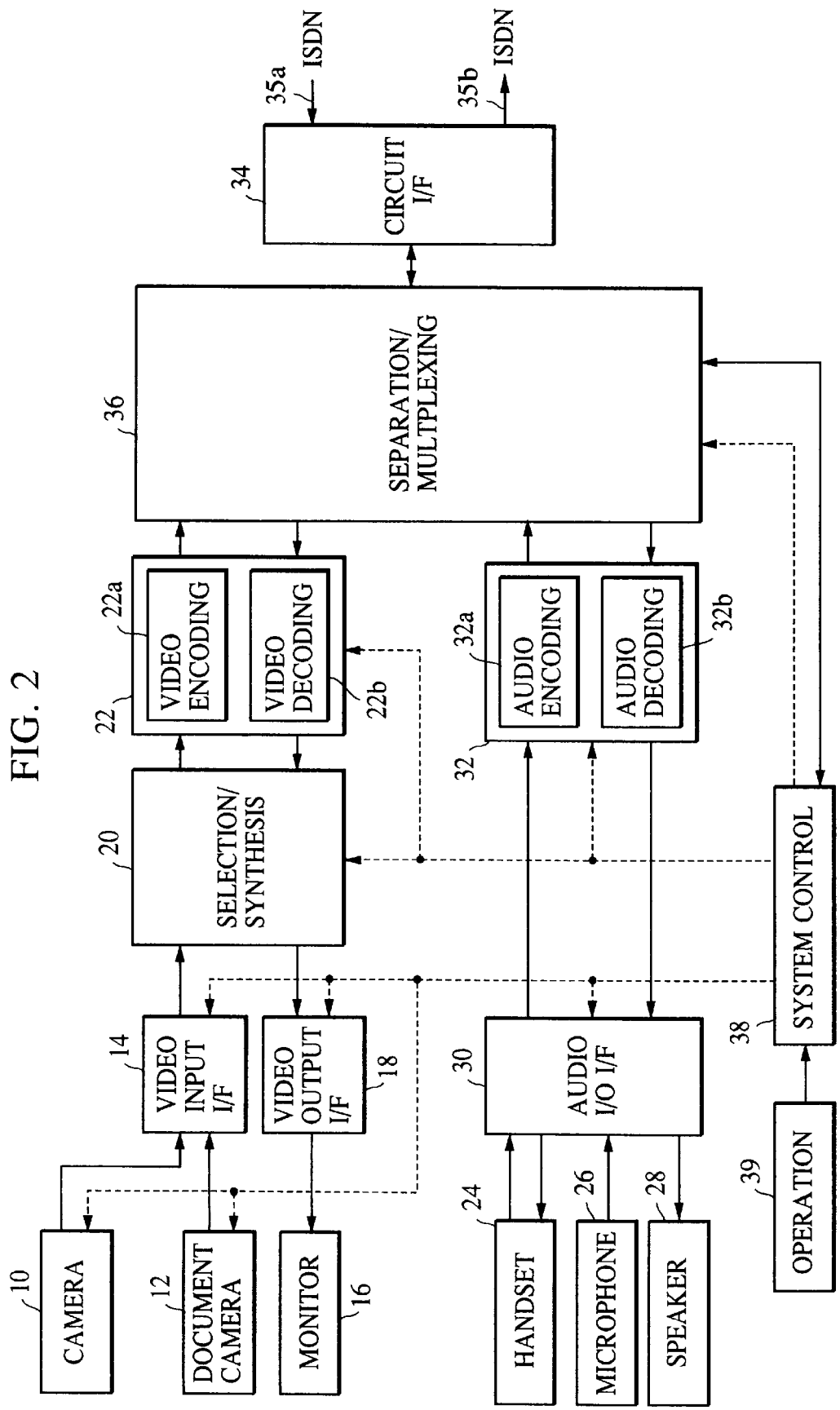

FIG. 6

| AUDIO (TERMINAL 300) | AUDIO (TERMINAL 304) | AUDIO (TERMINAL 306) | VIDEO (TERMINAL 300) | VIDEO (TERMINAL 304) | VIDEO (TERMINAL 306) | CONTROL |

METHOD, TERMINAL, AND SYSTEM FOR MULTI-STATION VIDEO COMMUNICATION

BACKGROUND OF THE INVENTION

1. Field of the Invention

This invention relates to a method, a terminal and a system for communication and, more particularly, to a method, a terminal and a system suitable for multi-station video communication.

2. Description of the Related Art

Recently, image compression coding techniques have been developed remarkably and digital communication networks have widely been extended. Audio and video service rules and protocols and multi-media multiplexing frame construction prescriptions for TV telephone communication or TV conferences have been provided as recommendations, while TV telephone apparatuses, TV conferences systems and various audio and video terminals have been proposed. In particular, a multi-station TV conferences system in which terminals in at least three stations are connected for TV conferences or video conferences has attracted attention.

A multi-station TV conference system, such as that shown in FIG. 10, is known which uses a multi-station communication control unit (hereinafter referred to as "MCU") for mutual connection between TV conference terminals in many stations to realize multi-station TV conferences.

Another system has been proposed in which TV conference terminals are connected by a circuit in the form of a loop or a bus and predetermined data is relayed by the terminals, thereby realizing multi-station TV conferences. More specifically, various kinds of data including video data and set in data fields assigned to the terminals are circulated through the circuit while being generated or updated by each terminal as desired.

The former multi-station TV conference system, in which all the TV conference terminals are connected to the MCU, and in which all the TV conference terminals and communications between the terminals are monitored and controlled by the MCU, entails a drawback described below. First, a TV conference cannot be held if the MCU is unable to operate or is being used for another multi-station TV conference. Second, because the MCU requires a plurality of communication control, encoding and decoding circuits to connect a plurality of terminals, it is very high-priced. Third, the number of conferees is limited by the terminal (line) capacity of the MCU.

The latter system, in which TV conference terminals are connected by a circuit in the form of a loop or a bus through which data having a multi-frame structure in which data fields provided for the data terminals are allotted to a multiplicity of frames is relayed or updated by the terminals while being circulated through the circuit, has the advantage of requiring no MCU. However, since the entire data is circulated through the communication circuit, each terminal receives the data that it has generated. It is meaningless for each terminal to receive the data that it has inserted in the communication circuit. In other words, a part of the communication circuit is always occupied essentially meaninglessly by some data. In the case of communication using moving picture information, the amount of transmitted information is so large that reductions in the communication speed and the efficiency of use of the communication circuit due to such unnecessary occupation of the communication circuit are not negligible. In such a case, the amount of useful information to be transmitted may be limited.

SUMMARY OF THE INVENTION

An object of the present invention is to provide a communication method, a communication terminal and a communication system free from the above-described problems.

Another object of the present invention is to realize efficient data transfer in a communication method, a communication terminal and a communication system for performing communication by circulating data through a circuit between a multiplicity of stations.

Still another object of the present invention is to increase the communication speed in a communication method, a communication terminal and a communication system for performing communication by circulating data through a circuit between a multiplicity of stations.

To achieve these objects, according to the present invention, there is provided a communication method of circulating communication data through a communication channel to which a plurality of terminals are connected, the method comprising the steps of:

deleting, from the data received by one of the terminals, information formed by another one of the terminals to which the first one of the terminals is to directly transmit the data;

adding information formed by the first one of the terminals to the data to be directly transmitted to the second one of the terminals; and outputting the data to the second one of the terminals.

A further object of the present invention is to provide a method, a terminal and a system for communication having novel functions.

These and other objects, features and advantages of the present invention will become apparent from the detailed description of the invention with reference to the accompanying drawings.

BRIEF DESCRIPTION OF THE DRAWINGS

FIG. 1, consisting of FIGS. 1A and 1B, is a schematic block diagram of a essential portion of a first embodiment of the present invention, i.e., an internal circuit of a separation/multiplexing unit 36 shown in FIG. 2;

FIG. 2 is a schematic block diagram of the configuration of a video communication unit in accordance with the first embodiment;

FIG. 6 is a diagram of the configuration of multiplexed frames transmitted from terminal 300 to terminal 302;

DESCRIPTION OF THE PREFERRED EMBODIMENT

The preferred embodiment of the present invention will be described below in detail with reference to the accompanying drawings.

<First Embodiment>

Figure 3:
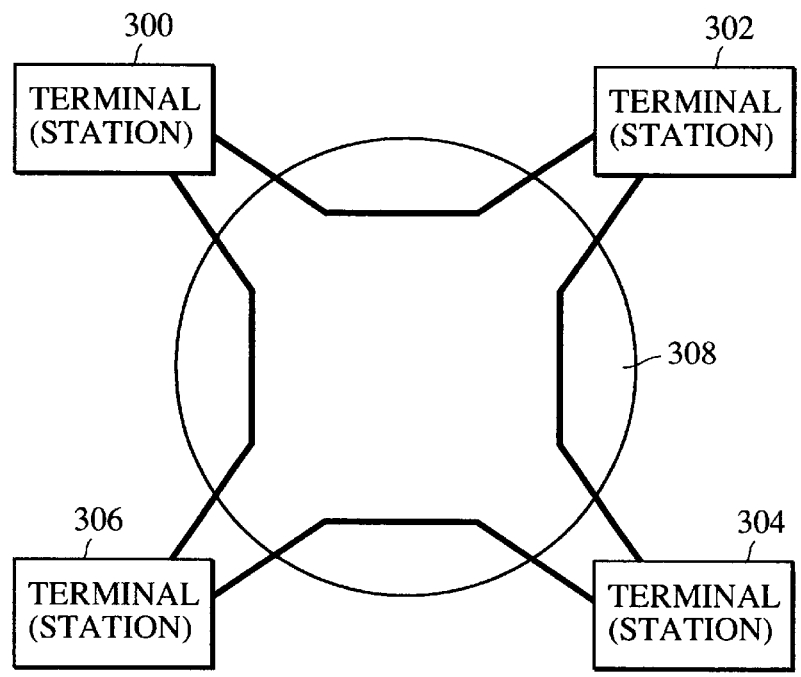
FIG. 3 is a schematic diagram of the configuration of a TV conference communication system in accordance with the first embodiment.

FIG. 3 is a schematic diagram of a system representing an application of the present invention to a TV conference system having four terminals. Blocks 300, 302, 304, and 306 in FIG. 3 represent terminals for a TV conference, and an area 308 represents a digital circuit of a digital network such as Integrated Service Digital Network (ISDN). The terminals 300, 302, 304, and 306 are connected by the digital circuit 308 so as to form a loop. The TV conference terminal 300 is connected to the TV conference terminals 302 and 306, the TV conference terminal 302 to the TV conference terminals 304 and 300, the TV conference terminal 304 to the TV conference terminals 306 and 302, and the TV conference terminal 306 to the TV conference terminals 304 and 300.

Communication frames formed by data generated by the terminals 300, 302, 304, and 306 are circulated through the communication circuit 308 in the form of a loop. Each TV conference terminal 300, 302, 304, or 306 substitutes, for a part of received data, data which it has generated, and transmits the substituted data along with the rest of the received data, which is retransmitted without being changed. Also, each TV conference terminal 300, 302, 304, or 306 suitably processes the received data and supplies the processed data to an output device such as an image monitor or a speaker provided in the terminal.

FIG. 2 is a block diagram schematically showing the configuration of each of the TV conference terminals 300, 302, 304, and 306. In FIG. 2, a block 10 represents a panelist camera for taking a picture of a conferee in a conference, a block 12 a document camera for taking a picture of conference materials such as drawings, a block 14 a video input interface for selecting outputs from the cameras 10 and 12 and for converting a selected output into a signal in accordance with a predetermined internal format, a block 16 a monitor for displaying images, and a block 18 a video output interface for supplying a video signal to the monitor 16.

The monitor 16 may be formed of a single image display unit or a plurality of image display units. In the case of a single image display unit, a window display system may be adopted to display a plurality of images in separate windows.

A block 20 represents a selection/synthesis circuit which selects images of input video signals from the cameras 10 and 12 and a received video signal, synthesizes an image from selected images (for example, by picture-in-picture processing and/or frame freezing), and supplies a video signal of the synthesized image to the video output interface 18. A block 22 represents a video encoding/decoding circuit consisting of a video encoding circuit 22a for encoding a video signal to be transmitted and a video decoding circuit 22b for decoding a received coded video signal.

A block 24 represents a handset having a microphone and a speaker, a block 26 a microphone, a block 28 a speaker, and a block 30 an audio input/output interface for interfacing with the handset 24, the microphone 26 and the speaker 28. The audio input/output interface 30 not only changes audio inputs and outputs but also performs echo canceling processing and generates a dial tone, a call tone, a busy tone and an incoming tone. A block 32 represents an audio encoding/decoding circuit consisting of an audio encoding circuit 32a for encoding an audio signal to be transmitted and an audio decoding circuit 32b for decoding a received coded audio signal.

A block 34 represents a circuit interface connected to two communication lines (e.g., ISDN lines) 35a and 35b. In this embodiment, the communication line 35a is used for receiving data while the communication line 35b is used for transmitting data. The communication lines 35a and 35b are connected to the adjacent terminals on the communication channel in the form of a loop. A block 36 represents a separation/multiplexing unit which multiplexes coded information which is supplied from the video encoding circuit 22a and the audio encoding circuit 32a to be transmitted. The separation/multiplexing unit 36 also separates coded video information, coded audio information, data and control commands from received information supplied from the circuit interface 34, and supplies video information to the video decoding circuit 22b, audio information to the audio decoding circuit 32b and data and control commands to a system control circuit 38 described below 38.

The system control circuit 38 is formed of a central processing unit (CPU), a read only memory (ROM), a random access memory (RAM) and an auxiliary storage device. The system control circuit 38 controls the entire circuit, particularly the video input interface 14, the video output interface 18, the selection/synthesis circuit 20, the video encoding/decoding circuit 22, the audio input/output interface 30, the audio encoding/decoding circuit 32 and the separation/multiplexing unit 36. A block 39 represents an operating unit (e.g., a ten-key cluster, a keyboard or the like) used by a user to input predetermined instructions to the system control circuit 38.

The flows of video and audio signals when two of the terminals each constructed as shown in FIG. 2 exchange signals with each other for TV conference communication will be described briefly. One of input video signals from the panelist camera 10 and the document camera 12 is selected by the video input interface 14 to be input to the selection/synthesis circuit 20. Ordinarily, the selection/synthesis circuit 20 directly supplies the input video signal from the camera 10 or 20 to the video encoding circuit 22a in the video encoding/decoding circuit 22. The video encoding circuit 22a encodes the input video signal in an encoding mode in accordance with a control signal from the system control circuit 38 and its internal decision operation, and outputs the encoded video signal to the separation/multiplexing unit 36.

On the other hand, an input audio signal from the microphone or the handset 24 or the microphone 26 is supplied to the audio encoding circuit 32a of the audio encoding/decoding circuit 32 through the audio input/output interface 30. The audio signal thereby encoded is supplied to the separation/multiplexing unit 36.

The separation/multiplexing unit 36 multiplexes the coded signals from the encoding circuits 22a and 32a and outputs a signal formed by multiplexing to the circuit interface 34. The circuit interface 34 outputs, to the communication line 35b, the information signal supplied from the separation/multiplexing unit 36 to be transmitted.

A signal received from the communication line 35a is supplied from the circuit interface 34 to the separation/multiplexing unit 36. The separation/multiplexing unit 36 separates a coded video signal and a coded audio signal from the received signal and inputs these signals to the video decoding circuit 22a and the audio decoding circuit 32a. The video decoding circuit 22b decodes the coded video signal from the separation/multiplexing unit 36 and inputs the decoded signal to the selection/synthesis circuit 20.

The selection/synthesis circuit 20 selects images of the input image signal from the video input interface 14 and the received video signal from the video decoding circuit 22b and synthesizes an image from the selected images by being controlled through a control signal by the system control circuit 38. For example, the selection/synthesis circuit 20 performs, as synthesis processing, well-known picture-in-picture processing of an input image and a received image and processing for setting images in corresponding windows of the window display system. The image monitor 16 displays the image of the video signal from the video interface 18. Thus, the input images and/or received image is displayed on the screen of the monitor 16.

The received audio signal decoded by the audio decoding circuit 32b is applied to the speaker of the handset 24 and/or the speaker 28 through the video input/output interface 30, thereby enabling the user to hear voice from the terminal at the other end of the communication line.

A command or the like other than images and voice to be transmitted to the other end of the line is directly supplied from the system control circuit 38 to the separation/multiplexing unit 36. A received command is directly supplied from the separation/multiplexing unit 36 to the system control circuit 38.

Figure 4:
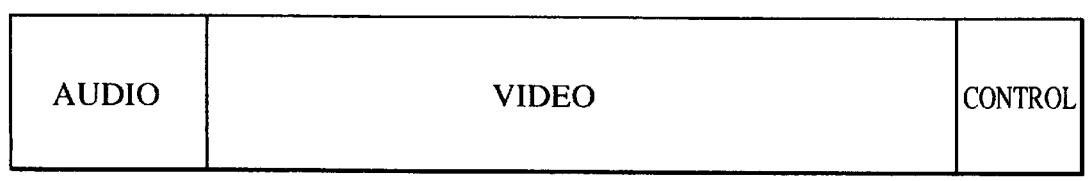
FIG. 4 is a diagram of the basic structure of multiplexed communication frames.

FIG. 4 shows an example of the configuration of multiplexed frames of various kinds of information, i.e., video information, audio information and control information in this embodiment.

The operation in the case of TV conference communication between three or more stations will next be described. The following description is made on the operation of TV conference terminal 300, which will be referred to as the "present terminal".

The operation of the entire TV conference communication system will first be described schematically. As mentioned above, data generated by TV conference terminals constituting the TV conference communication system so as to form predetermined communication frames is transmitted through the loop of the digital communication circuit in which the TV conference terminals are connected.

First, the terminal 300 receives data from the TV conference terminal 306 through the digital communication network 308. The received data has a communication frame configuration in which data generated by the TV conference terminals 302, 304 and 406 are multiplexed. Data generated by the TV conference terminal 300 (present terminal) is not included the communication frames of the received data. Accordingly, the terminal 300 does not receive the data that it has output to the communication circuit 308.

In the terminal 300, the separation/multiplexing unit 36 sorts the received frame data and separates the data according to the terminals that have generated the data. Received coded video data separated is transferred one by one to the video decoding section 22b to be decoded. The decoded data is input to the motor 16 through the selection/synthesis circuit 20 and the video output interface 18 to be displayed as an image.

Similarly, separated received coded audio data is processed by the audio decoding section 32b and input to the handset 24 or the speaker 28 through the audio input/output interface 30, thus obtaining an audio output. A control signal or the like is transferred to the system control circuit 38.

While performing the above-described operation, the terminal 300 retransmits data in predetermined fields in the received frames. That is, the retransmitting operation of this embodiment is performed so as to selectively transmit data portions required by the receiving terminal instead of simply sending back the received frame data to the communication network. More specifically, the terminal 300 detects and recognizes data in data fields (in communication frames) generated by the TV conference terminal 302 that is the next destination of retransmission, deletes the data in the fields, sets data generated in the TV conference terminal 300 in the fields emptied by this deletion, and transmits the entire data to the TV conference terminal 302.

Figure 5:
FIG. 5 is a diagram of the configuration of multiplexed frames received by terminal 300 from terminal 306.
Figure 7:
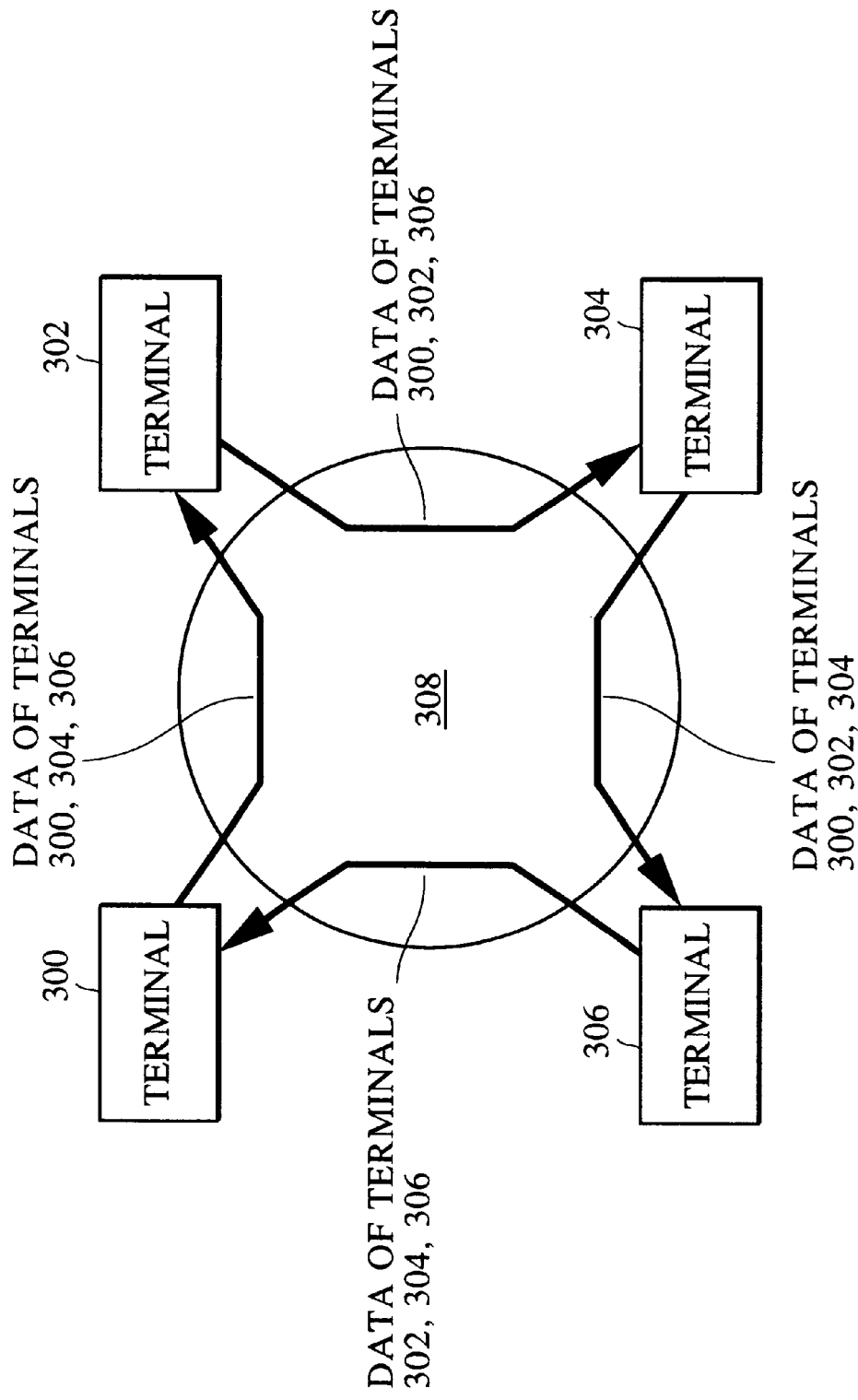
FIG. 7 is a schematic diagram of the directions of data transmission between terminals in the first embodiment.

FIG. 5 shows an example of the configuration of multiplexed frames of the different kinds of information in received data with respect to the terminals 302, 304 and 306, and FIG. 6 shows an example of the configuration of multiplexed frames of the different kinds of information in transmitted data with respect to the terminals 302, 304 and 306. It is assumed here that the rate at which data is transmitted through the communication line connecting the terminals is R while the transmission rate assigned to each terminal is R/3. FIG. 7 is a schematic diagram of the directions of data transmission between the terminals.

The internal circuit configuration of the separation/multiplexing unit 36 for realizing such selective retransmission will be described. FIG. 1 is a schematic block diagram of the separation/multiplexing unit 36.

A block 100 in FIG. 1 represents a multiplexing section formed of a video multiplexing circuit 102 for multiplexing coded video data supplied from the video encoding circuit 22a to be transmitted (data generated by the present terminal) and coded video data to be retransmitted (data generated by the other terminals and required by the receiving terminal subsequent to the present terminal), an audio multiplexing circuit 104 for multiplexing coded audio data supplied from the audio encoding circuit 32a to be transmitted (data generated by the present terminal) and coded audio data to be retransmitted (data generated by the other terminals and required by the receiving terminal), and a multiplexing circuit 106 for multiplexing an output from the video multiplexing circuit 102, an output from the audio multiplexing circuit 104 and control data (including sync data) from the system control circuit 38.

A block 108 represents a separation section formed of a separation circuit 110 for separating received multiplexed data supplied from the circuit interface 34 into video information, audio information, control information to the system control circuit 38, and the like, a video separation circuit 112 for separating the video information output from the separation circuit 110 with respect to the terminals, and an audio separation circuit 114 for separating the audio information output from the separation circuit 100 with respect to the terminals.

A block 116 represents a station information manager which discriminates, from control data separated by the separation circuit 110, data on the terminals that have generated data set in the multiplex communication frames, and which serves to output information from the stations. The station information manager 116 manages terminal information by correlating the result of discrimination of the data generation source terminals and the data in the received communication frames.

A block 118 represents a canceler for deleting, on the basis of the terminal information from the station information manager, a data portion generated by the receiving terminal (the terminal to which the present terminal is to directly transmit data) in the outputs from the video separation circuit 112 and the audio separation circuit 114. A video output and an audio output from the canceler 118 are input to the video multiplexing circuit 102 and the audio multiplexing circuit 104, respectively, as coded information to be retransmitted.

The operation of the unit shown in FIG. 1 will be described in detail.

The separating operation of the separation section 108 will first be described. The separation section 108 is supplied with data received from the communication line 35a through the circuit interface 34 (FIG. 2). The received data input to the separation section 108 has multiplexed communication frames in which video data, audio data, control data and the like are multiplexed. The separation circuit 110 separates video data, audio data and control data from the multiplexed frames according to frame configuration information included in the control data, and outputs the video data to the video separation circuit 112, the audio data to the audio separation circuit 114 and the control data and the like to the system control circuit 38 and the station information manager 116. The above-described operation is performed on the basis of separation control data generated by a control instruction from the control circuit 38.

The video separation circuit 112 and the audio separation circuit 114 further separate the separated video and audio data with respect to the terminals from which the data has been generated. As terminal information, information previously separated from the control data by the separation circuit and input to the station information manager 116 is prepared. The video separation circuit 112 outputs the video data separated with respect to the stations to the video decoding circuit 22b and to the canceler 118. Similarly, the audio separation circuit 114 outputs the audio data separated with respect to the stations to the audio decoding circuit 32b and to the canceler 118.

As described above, the received data separated according to the kinds of data is further separated with respect to the generation source terminals, and the separated data is supplied to the processing circuit in the present terminal and also to the canceler 118 for retransmission. More specifically, data in the communication frame structure received from the TV conference terminal 306 is separated into various kinds of data, i.e., video data, audio data, control data and the like, which are further separated into data generated by the TV conference terminal 302, data generated by the TV conference terminal 304, and data generated by the TV conference terminal 306.

The canceler 118 operates as described below. In the following description, the information generated by the terminals is referred to as station information. That is, video and audio data generated by each terminal are expressed as station video data and station audio data, respectively.

The canceler 118 receives video data and audio data from the video separation circuit 112 and the audio separation circuit 114, respectively, which have been generated by the terminals other than the present terminal. The canceler 118 also receives terminal information, which has previously been separated from control data and supplied, and which indicates the terminals as the sources of the video and audio data. The canceler 118 further receives information on the next data transmission destination from the system control circuit 38. The canceler 118 detects data fields generated by the terminal that is the next transmission destination, and cancels or deletes the data fields generated by the next destination terminal in the station video data and the station audio data from the video separation circuit 112 and the audio separation circuit 114. The data in which only the data fields generated by the next destination terminal has been canceled is input to the video multiplexing circuit 102 and the audio multiplexing terminal 104 as data to be transmitted to the next transmission destination, i.e., retransmitted coded video data and retransmitted coded audio data.

The station information manager 116 detects and recognizes, from control data received and separated, terminal information set with different groups of data, discriminates stations where the different groups of data have been set, and correlates the discriminated stations and the data. Further, the station information manager 116 performs a role in multiplexing control in association with the video multiplexing circuit 102, the audio multiplexing circuit 104 and the multiplexing circuit 106 in accordance with an instruction from the system control circuit 38.

The multiplexing operation of the multiplexing section 100 will next be described. The video multiplexing circuit 102 receives coded video data of the present terminal from the video encoding circuit 22a and also receives, from the canceler 118, coded video data to be retransmitted. The video multiplexing circuit 102 multiplexes these kinds of data on the basis of terminal information from the station information manager 116 and multiplexing control information from the system control circuit 38. The coded video data of the present terminal is inserted in the field where data has been deleted by the canceler 118, i.e., the data field assigned to the retransmission destination (next destination) terminal.

Also, the audio multiplexing circuit 104 receives coded audio data of the present terminal from the audio encoding circuit 32a and also receives, from the canceler 118, coded audio data to be retransmitted. The audio multiplexing circuit 104 multiplexes these kinds of data on the basis of the terminal information from the station information manager 116 and the multiplexing control information from the system control circuit 38. The coded audio data of the present terminal is also inserted in the field where data has been deleted by the canceler 118, i.e., the data field assigned to the retransmission destination (next destination) terminal.

The multiplexing circuit 106 multiplexes multiplexed video data from the video multiplexing circuit 102, multiplexed audio data from the audio multiplexing circuit 104, and control data, sync data and the like from the system control circuit 38.

In this embodiment, as described above, data generated by the next destination terminal is deleted and data of the present terminal is inserted in place of the deleted data. That is, the present terminal retransmits the data by using the data fields assigned to the next destination terminal (or transmission rate) as data fields (transmission rate) assigned to the present terminal.

By the above-described separation/multiplexing operation, the TV conference terminal 300 cancels the fields in which data generated by the next data transmission destination is set in the data received from the TV conference terminal 306 (data placed on the communication line by TV conference terminals 302, 304, and 306), inserts data generated by the present terminal in place of the canceled fields, and transmits the resulting data to the TV conference terminal 302.

If the above-described operation is performed, data meaningless for the next destination terminal is not transmitted while only useful data to be transmitted is retransmitted in a situation where communication data frames formed by data generated by a plurality of TV conference terminals are circulated through a loop. It is therefore possible to realize an efficient multi-station TV conference communication system capable of effectively using a communication circuit.

Figure 8:
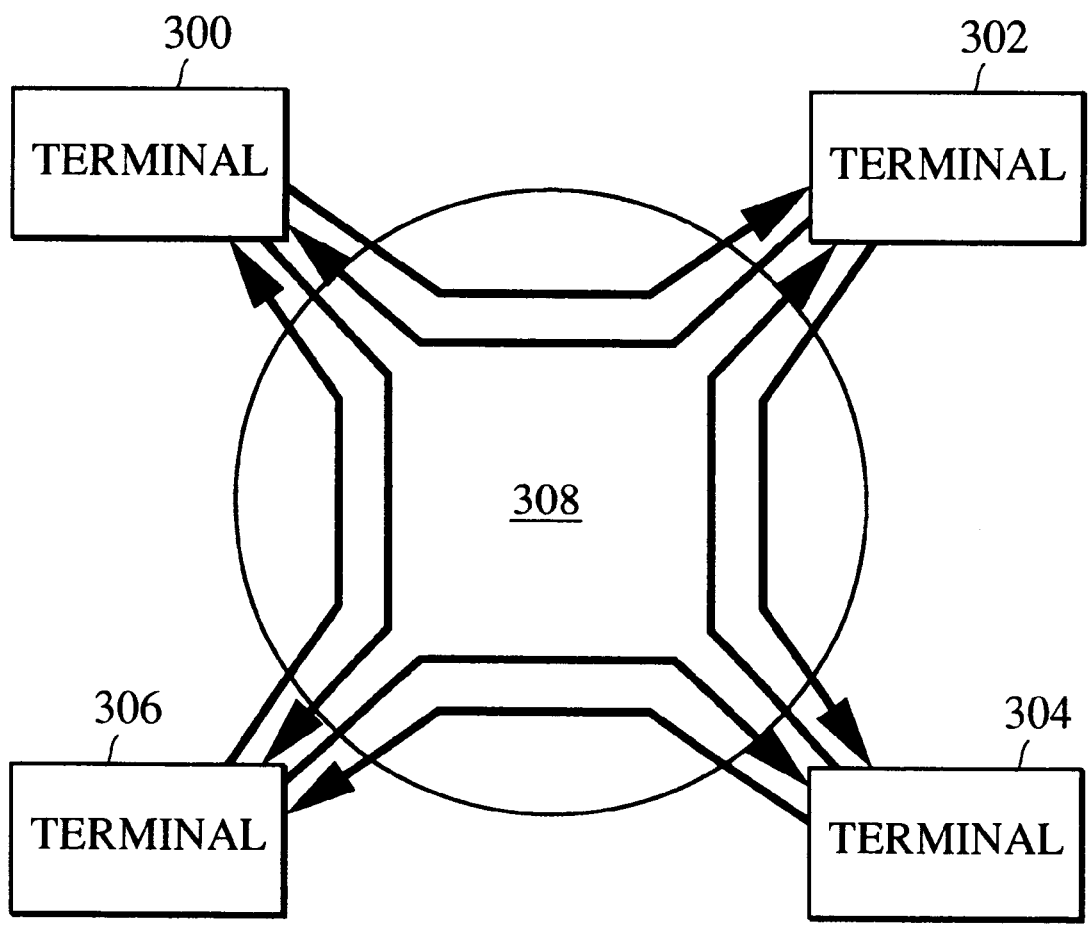
FIG. 8 is a diagram of a dual loop connection in a case of using an ISDN circuit in the first embodiment.

The embodiment has been described with respect to a loop of one transmission direction. Needless to say, however, bidirectional transmission between terminals is possible in the ISDN network and the like, and two loops for transmission in opposite directions may actually be formed and utilized, as shown in FIG. 8.

In the above-described embodiment, data to be transmitted by the TV conference terminals is video and audio information. However, the present invention is not limited to the system using these kinds of data. Needless to say, the present invention can also be applied in the same manner to transmission of various kinds of information effective in TV communication conference between two or more stations and to transmission of control information for controlling communication between a multiplicity of stations or for controlling terminals. While multi-station TV conference has been described by way of example, it is apparent that the present invention can also be applied to other kinds of video communication.

In the above-described embodiment, equal transmission rates of communication frames are assigned to the terminals. However, it is apparent that the transmission rate can be set to different values or variably set with respect to the terminals. It is also possible to set a rate for control in order to transmit or circulate control data for multi-station communication or the like. In such a case, a coefficient of utilization can be improved.

Figure 9:
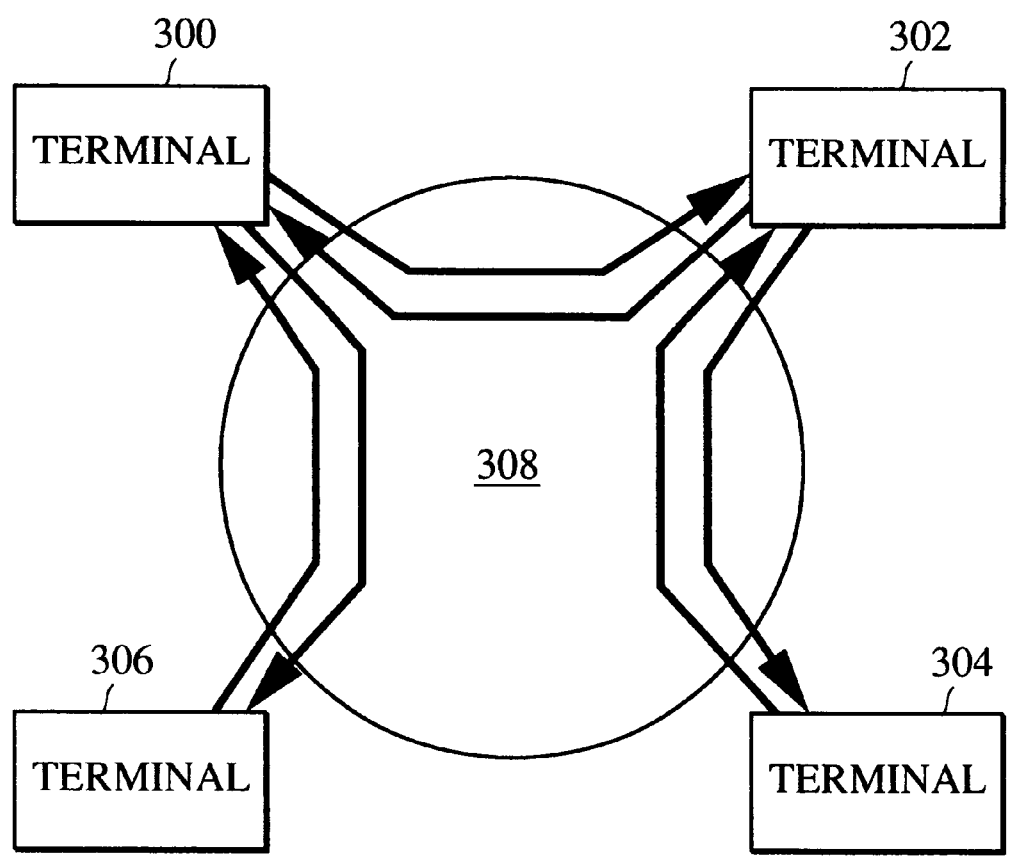
FIG. 9 is a diagram of an example of a connection in the form of a chain.
Figure 10:
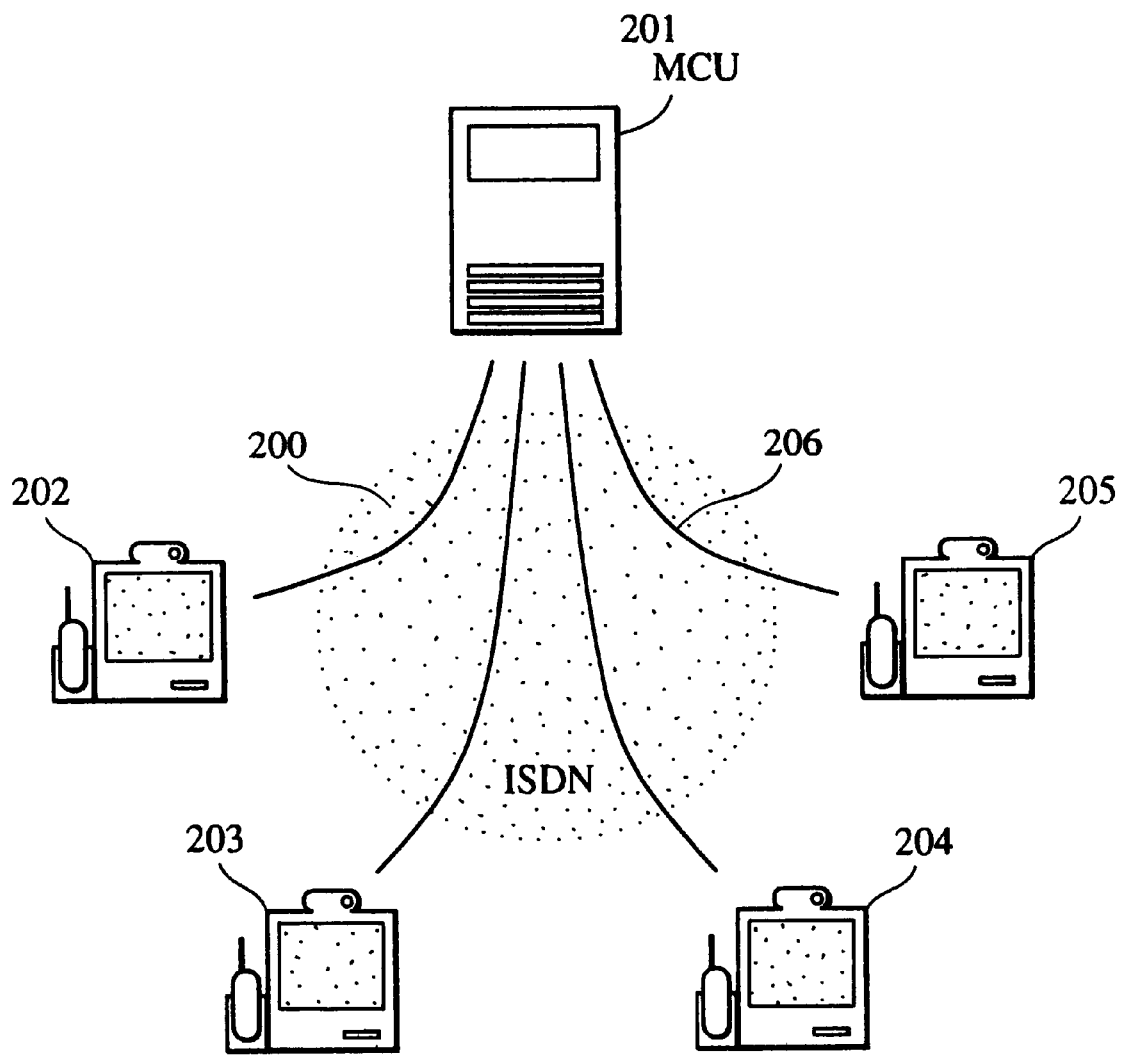
FIG. 10 is a diagram of the configuration of a TV conference system using a micro control unit.

In the above-described embodiment, four stations are connected by a circuit in the form of a loop. The embodiment, however, is not limited to this number of stations and this form of connection. That is, the number of stations may be three, five or more and the circuit connecting the terminals may be in the form of a chain such as that shown in FIG. 9 or any other form as well as the form of a loop.

In the above-described embodiment, a two-step process is adopted in which, in multiplexed communication frames, data fields of information formed by the terminal to which the present terminal is to directly transmit data are deleted and information generated by the present terminal is thereafter inserted. However, if the data fields available to the terminals are equal to each other in size, information generated by the present terminal may simply be set in an overwriting manner directly in fields of information formed by the terminal to which the present terminal is to transmit data.

If terminals taking part in a TV conference are determined when the conference is set up and if the positions at which information generated by each terminal is set in multiplexed communication frames is fixed, it is not necessary to prepare information representing the one-to-one relationship between data fields and the terminals that have generated information set in the data fields in the multiplexed communication frames. This is because each terminal can relate the generated information with the terminals from the positions in the multiplexed communication frames. Needless to say, if one or more terminals are allowed to take part in the middle of the TV conference, it is convenient to include, in the multiplexed communication frames, information representing the one-to-one relationship between data fields and the terminals that have generated information set in the data fields in the multiplexed communication frames. This is because the need for the operation and time for updating information on the order of array of terminals taking part in the conference each time a terminal joins in the conference can be eliminated.

In this embodiment, as can be easily understood from the foregoing, it is possible to improve the efficiency of utilization of a communication circuit in a communication system in which communication data is circulated through the communication circuit connecting a plurality of terminals. Accordingly, it is possible to achieve a higher communication speed and to use a comparatively low-speed communication channel to realize even communication using a very large amount of video data.

To insert information generated by the present terminal in the field of the communication frame where information generated by the terminal to which the present terminal is to directly transmit data is deleted, the information generated by the terminal to which the present terminal is to directly transmit data may be replaced with the data generated by the present terminal. The need for two steps of deleting the information generated by the terminal to which the present terminal is to directly transmit data and thereafter inserting the information generated by the present terminal is thereby eliminated, and the same effect can be achieved by one processing step.

<Second embodiment>

In the first embodiment, in the loop or bus type communication circuit, the present terminal deletes data generated by the next terminal and included in the data received by the present terminal in order to prevent transmission of data meaningless for the next terminal. In the second embodiment, inefficient data transfer is prevented in such a manner that a terminal A, for example, previously sets, in transmitted data, destination terminal information on terminals to which the terminal A is to transmit the data, and a terminal (e.g., a terminal C) to which the data has been transmitted from the terminal A discards the data if no terminal subsequent to the terminal C is designated by the destination terminal information.

An example of a communication terminal for use in an inter-station TV conference system in accordance with the second embodiment of the present invention will be described below.

Figure 11:
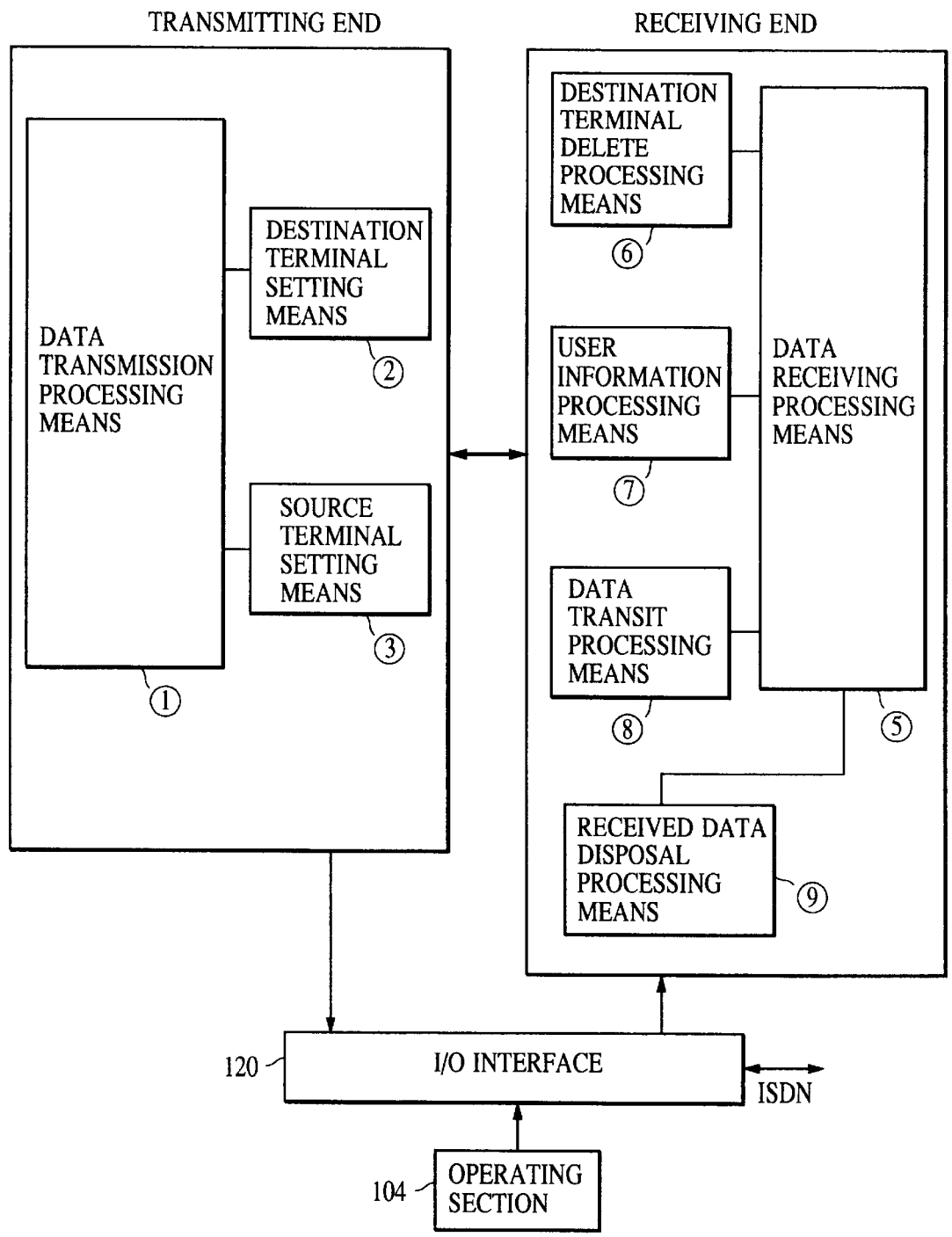
FIG. 11 is a functional diagram of a communication terminal of a second embodiment of the present invention.

FIG. 11 is a functional block diagram of a communication terminal used in an inter-station TV conference system of this embodiment. As shown in FIG. 11, the communication terminal has a data transmission processing means ①, a destination terminal setting means ②, a source terminal setting means ③, a data receiving processing means ⑤, a destination terminal delete processing means ⑥, a user information processing means ⑦, a data transit processing means ⑧, a received data disposal processing means ⑨, and an input/output interface 120. Each of the above-described means ① to ⑨ is provided in the form of a program stored in a read only memory (ROM) 102 mentioned below and operation of a CPU 101. The input/output interface 120 is provided to connect this communication terminal to a digital circuit and external units. The ISDN basic interface and an operating section 104 such as a keyboard are connected to the terminal through the input/output interface 120.

Figure 12:
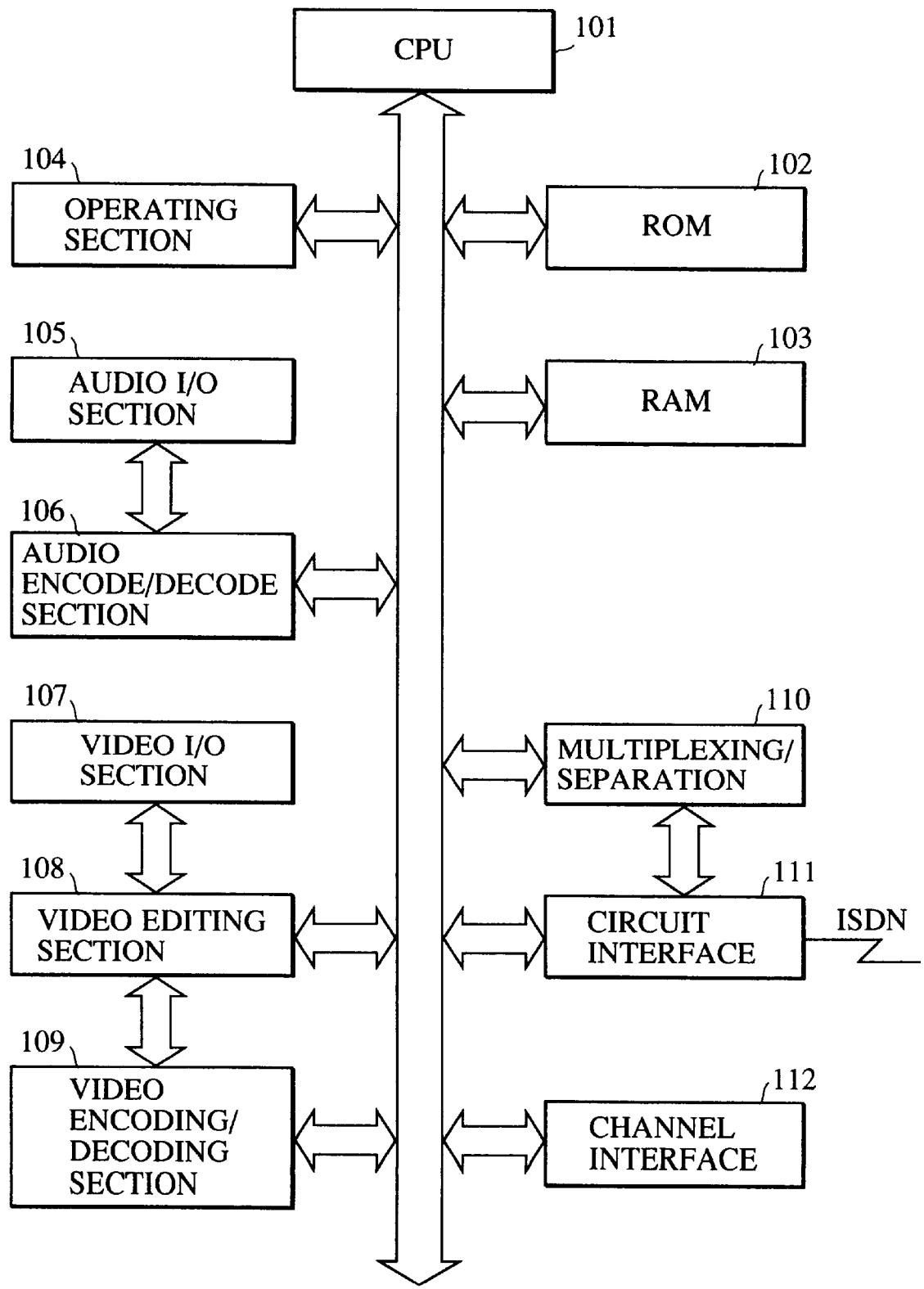
FIG. 12 is a block diagram of the configuration of the communication terminal of the second embodiment.

FIG. 12 shows the hardware construction of the communication terminal of the second embodiment.

The CPU 101 executes processing based on the program stored in the ROM 102.

As mentioned above, the ROM 102 stores the program for realizing the functions of the above-described means, i.e., the data transmission processing means ① to the received data disposal processing means ⑨.

A block 103 represents a random access memory (RAM) having a storage area for storing various categories of data and a work area for the CPU 101.

The operating section 104 has input devices such as a keyboard, a tablet and a mouse used to input control information for controlling the communication terminal of the second embodiment.

A block 105 represents an audio input/output means which has a handset, a microphone and a speaker and which is provided to perform processing for analog-digital conversion and digital-analog conversion of audio signals.

A block 106 represents an audio encode/decode section for encoding a transmitted audio signal and for decoding a received audio signal in accordance with the audio encoding/decoding algorithm prescribed in the ITU-T recommendation G series.

A block 107 represents a video input/output means which has a CRT monitor, a panelist camera and a document camera and which is provided to perform processing for analog-digital conversion and digital-analog conversion of video signals.

A block 108 represents a video editing means for performing windowing, filtering and processing for synthesis of character data and/or graphic data.

A block 109 represents a video encoding/decoding section for encoding a transmitted image and for decoding a received image in accordance with the video encoding/decoding algorithm prescribed in the ITU-T recommendation H.261.

A block 110 represents a multiplexing/separation section which performs multiplexing in accordance with the ITU-T recommendation H.221 to multiplex an audio signal from the audio encoding/decoding section 6, a video signal from the video encoding/decoding section 9 and various data signals input through a channel interface 112 with respect to transmitted frame units according to the present transmission capacity and the present transmission mode, and which also performs separation processing by separating received frames with respects to constituent media and by supplying information to the audio encoding/decoding section 106, the video encoding/decoding section 109 and the channel interface 112.

A block 111 represents a circuit interface connected to an ISDN circuit and provided to perform circuit control in accordance with the ISDN user network interface.

The channel interface 112 mentioned above is provided for connection to an external unit such as a personal computer.

In the second embodiment, data transfer between adjacent terminals is performed by using the low speed data (LSD) slot of the H.221 frame prescribed in the ITU recommendation H.221 and processed with the multiplexing/separation section 110 and by applying the Link Access Protocol, Balanced (LAPB) to the LSD slot.

Figure 14:
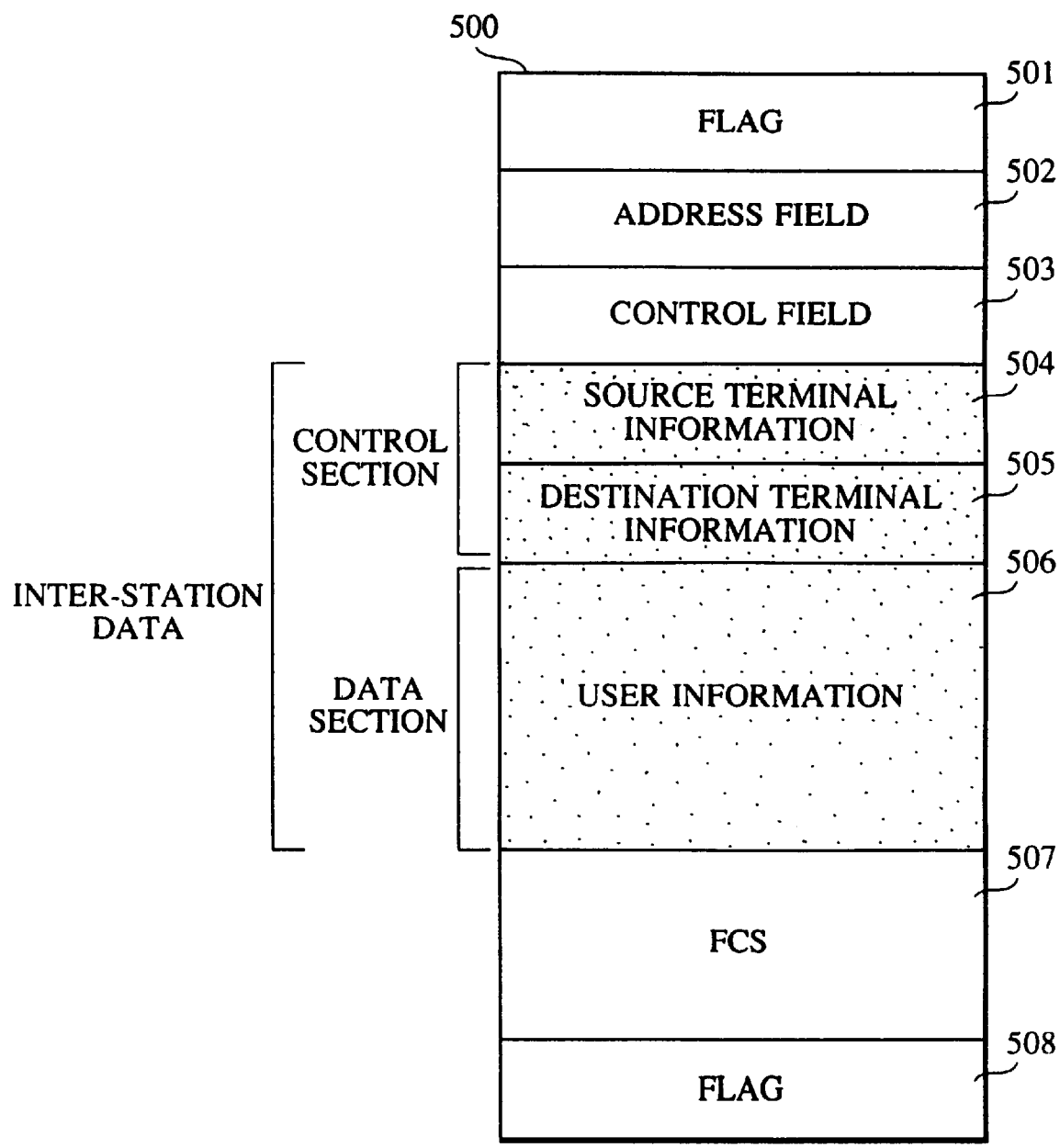
FIG. 14 is a diagram of the structure of an example of a high level data link frame transit-transferred between communication terminals in the second embodiment.

FIG. 14 shows an example of the data structure of a high level data link (HDLC) frame transferred by the above-mentioned the LAPB in the communication terminal of this embodiment.

Referring to FIG. 14, an HDLC frame 500 transferred between communication terminals each arranged as described above has a start flag 501 for discrimination of the start of the HDLC frame 500, and an address field 502 for discrimination of command-response of the HDLC frame 500.

The HDLC frame 500 also has a control field 503 for discrimination of the kind of the HDLC frame 500, source terminal information 504 which occupies a part of a data field of the HDLC frame and which is used for discrimination of source terminals from which inter-station data transmitted between the stations has been generated, and destination terminal information 505 which occupies a part of the data field of the HDLC frame 500 and which is used for discrimination of destination terminals to which the inter-station data is to be transmitted.

The HDLC frame 500 further has user information 506 which occupies a part of the data field of the HDLC frame 500 and which is transferred as a part of the inter-station data, and a frame check sequence (FCS) 507 for detection of frame transmission error, and an end flag 508 for discrimination of the end of the HDLC frame 500.

In this embodiment, the inter-station data denotes information including source terminal information 504, destination terminal 505 and user information 506.

The inter-station data has a control section corresponding to source terminal information 504 and destination terminal information 505, and has a data section corresponding to user information 506.

Figure 15:
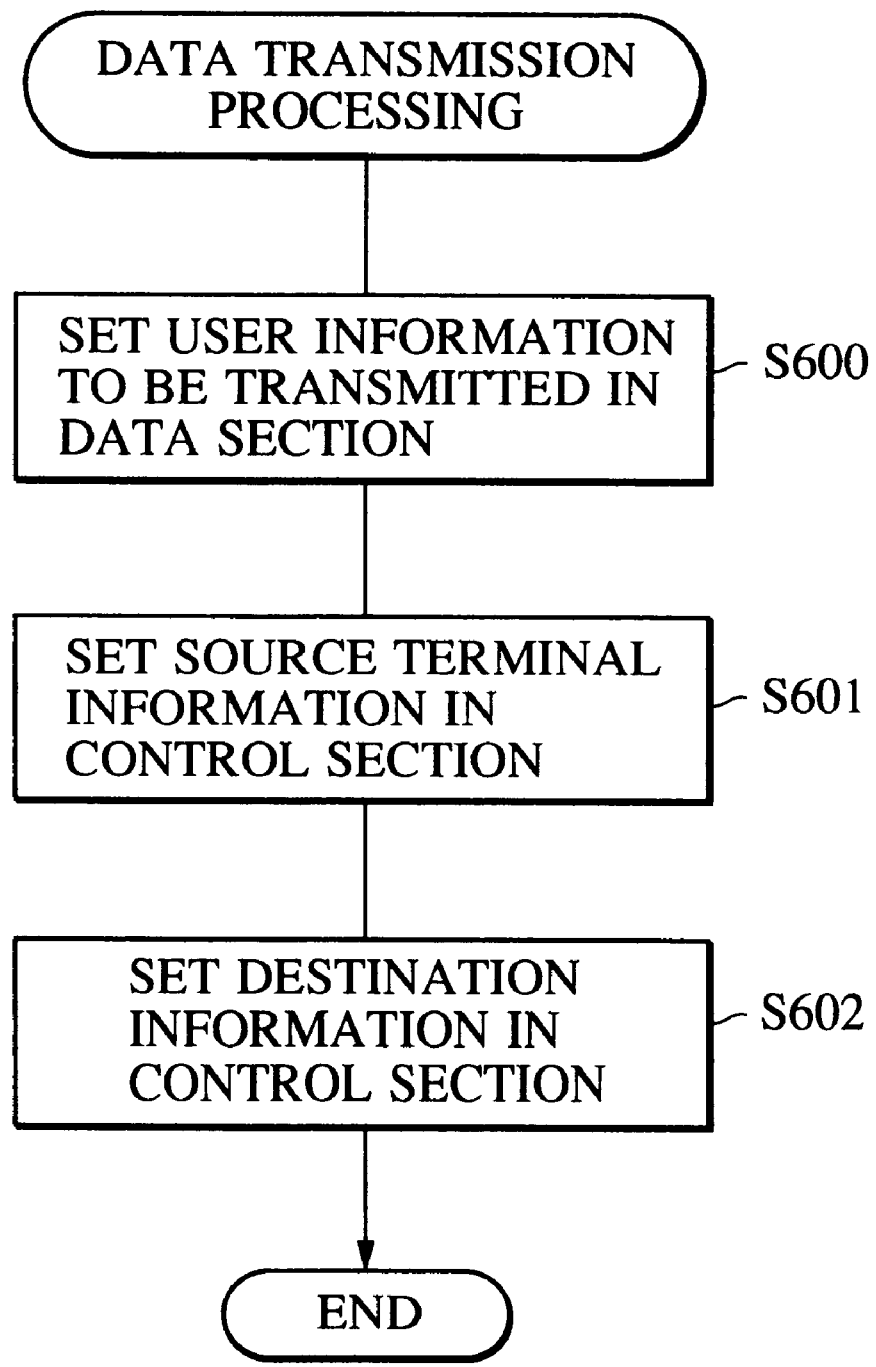
FIG. 15 is a flowchart of an example of data transmission processing in inter-station communication in accordance with the second embodiment.

FIG. 15 is a flowchart of an example of data transmission processing in the communication terminal of this embodiment.

In Step S600, user information to be transmitted by the communication terminal is set in the data section of the inter-station data.

In Step S601, information for discrimination of the present terminal is set in the control section of the inter-station data as source terminal information.

In Step S602, information for discrimination of one or more communication terminals taking part in the inter-station communication, i.e., the destinations of the user information set in Step S600, is set in the control section of the inter-station data as destination terminal information.

The data transmission processing shown in FIG. 15 is started in each communication terminal each time user information to be transmitted to the other terminals is generated.

Figure 16:
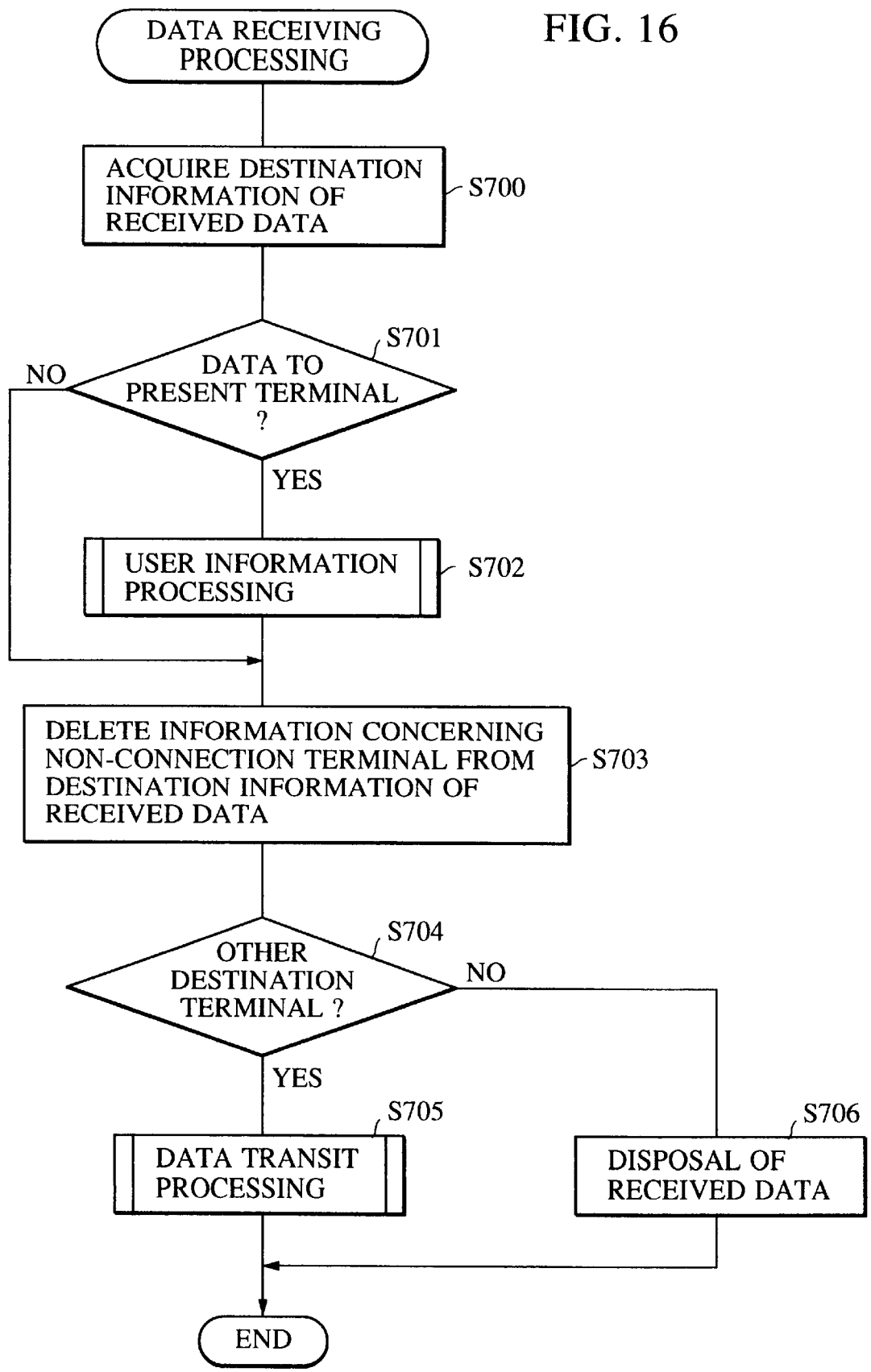
FIG. 16 is a flowchart of an example of data receiving processing in inter-station communication in accordance with the second embodiment.

FIG. 16 is a flowchart of an example of data receiving processing in the communication terminal of this embodiment.

In Step S700, destination terminal information is acquired from the control section of the received inter-station data.

In Step S701, the destination terminal information acquired in Step S700 is examined. If information designating the present terminal is contained as destination terminal information, the process advances to Step S702. If no information in the destination terminal information designates the present terminal, the process advances to Step S703.

In Step S702, user information processing is started to process the user information set in the data section of the inter-station data.

Next, in Step S703, examination is made to determine whether any information relating to a communication terminal not connected to the inter-station TV conference or a communication terminal which has withdrawn in the middle of the conference has been set as destination terminal information in inter-station data. If such information has been set, it is deleted. Information designating the kinds of communication terminals taking part in the TV conference is stored in RAM 103 of each terminal when the communication circuit is established. Similarly, information designating a terminal which withdraws from the conference is stored in RAM 103 at the time of withdrawing.

Accordingly, even if incorrect destination terminal information is set, it is possible to prevent a reduction in communication efficiency which may be caused by endless circulation of inter-station data.

In Step S704, examination is made to determine whether information relating to any communication terminal other than the present terminal has been set as destination terminal information in the inter-station data. If information relating to any other communication terminal has been set, the process advances to Step S705. If no such information has been set, the process advances to Step S706.

In Step S705, data transit processing is started to transfer the inter-station data to any communication terminal other than the present terminal designated by the destination terminal information in the inter-station data.

In Step S706, the inter-station data is discarded since the inter-station data has been transferred through all the communication terminals designated by the destination terminal information in the inter-station data. The data receiving processing shown in FIG. 16 is started in each communication terminal each time the inter-station data is received.

The above-descried arrangement makes it possible to prevent inefficient data transfer due to endless transit transfer of inter-station data.

Figure 17:
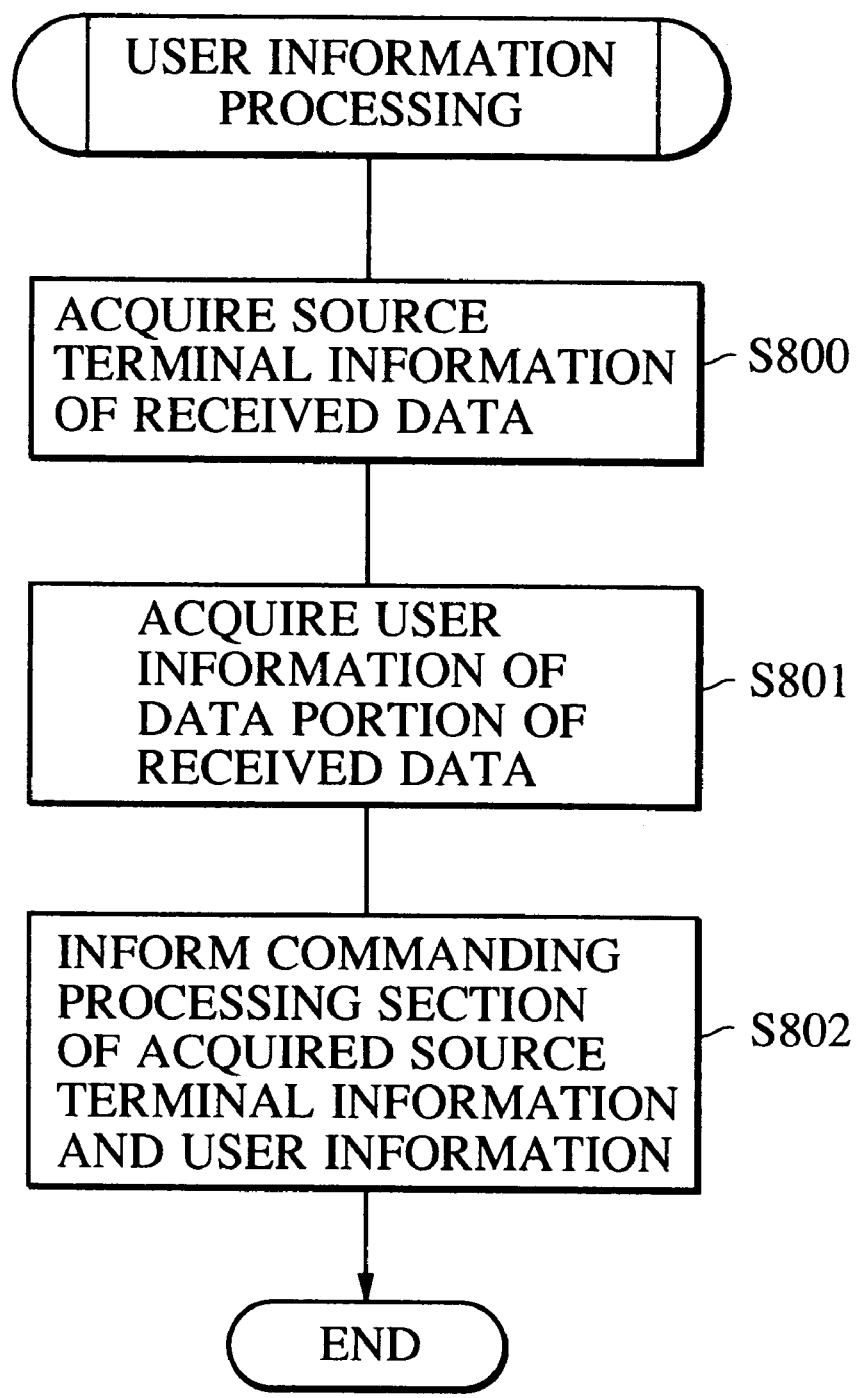
FIG. 17 is a flowchart of an example of user information processing in inter-station communication in accordance with the second embodiment.

FIG. 17 is a flowchart of an example of user information processing in the communication terminal of the second embodiment.

In Step S800, source terminal information set in the control section of the inter-station data is acquired.

In Step S801, user information set in the data section of the inter-station data is acquired.

In Step S802, the user information acquired in Step S801 is transferred to a commanding processing section, i.e., the user information processing section (7), along with the source terminal information acquired in Step S800 of FIG. 17.

Figure 18:
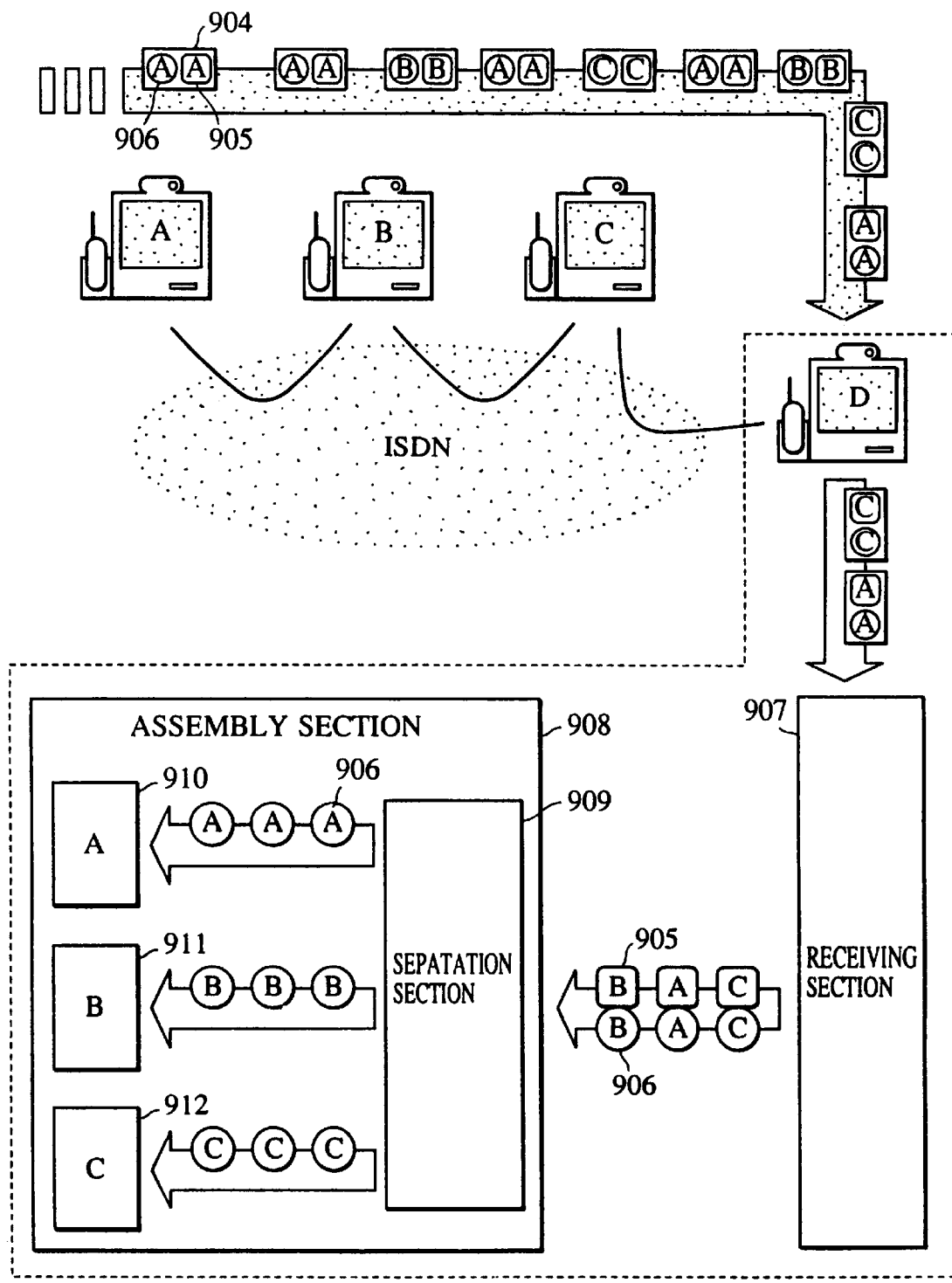
FIG. 18 is a schematic diagram of an example of user information assembly processing in inter-station communication in accordance with the second embodiment.

FIG. 18 is a diagram of the conception of processing for assembling user information transferred in Step S802.

Characters A to D in FIG. 18 designate the communication terminals taking part in the above-described inter-station communication. User information is transferred from the first communication terminal A to the second communication terminal B, to the third communication terminal C and to the fourth communication terminal D.

A block 904 represents the inter-station data transferred between the communication terminals through the HDLC frame 500 for data transfer shown in FIG. 14. A symbol 905 represents source terminal information set in the control section of the inter-station data 904 and designating one inter-station TV conference terminal to which the inter-station data is to be transferred. A symbol 906 represents user information set in the data section of the inter-station data 904.

A block 907 represents a receiving section for processing inter-station data 904 received by the data receiving processing shown in FIG. 16. A block 908 represents an assembly section (user information processing section (7)) to which source terminal information 905 and user information 906 in the inter-station data, which are discriminated as information destined for the fourth communication terminal by the receiving section 907, are transferred.

A block 909 represents a separation section in which the received user information 906 is separated with respect to the inter-station TV conference terminals A to C by using the source terminal information 905.

Blocks 910 to 912 represent user information storage areas (RAM) in which the user information separated with respect to the inter-station TV conference terminals are accumulated and reassembled.

As shown in FIG. 18, inter-station data 904 transmitted to the fourth communication terminal from the inter-station TV conference terminals A to C is checked as to whether it is destined for the fourth communication terminal D. Then, source terminal information 905 and user information 906 in the inter-station data 904 to the fourth communication terminal D are transferred to the assembly section 908.

In the assembly section 908, user information 906 transferred along with source terminal information 905 is separated with respect to the communication terminals A to C by the separation section 909 using source terminal information 905, and is stored and reassembled in the user information storage areas 910 to 912 provided with respect to the communication terminals A to C.

Figure 19:
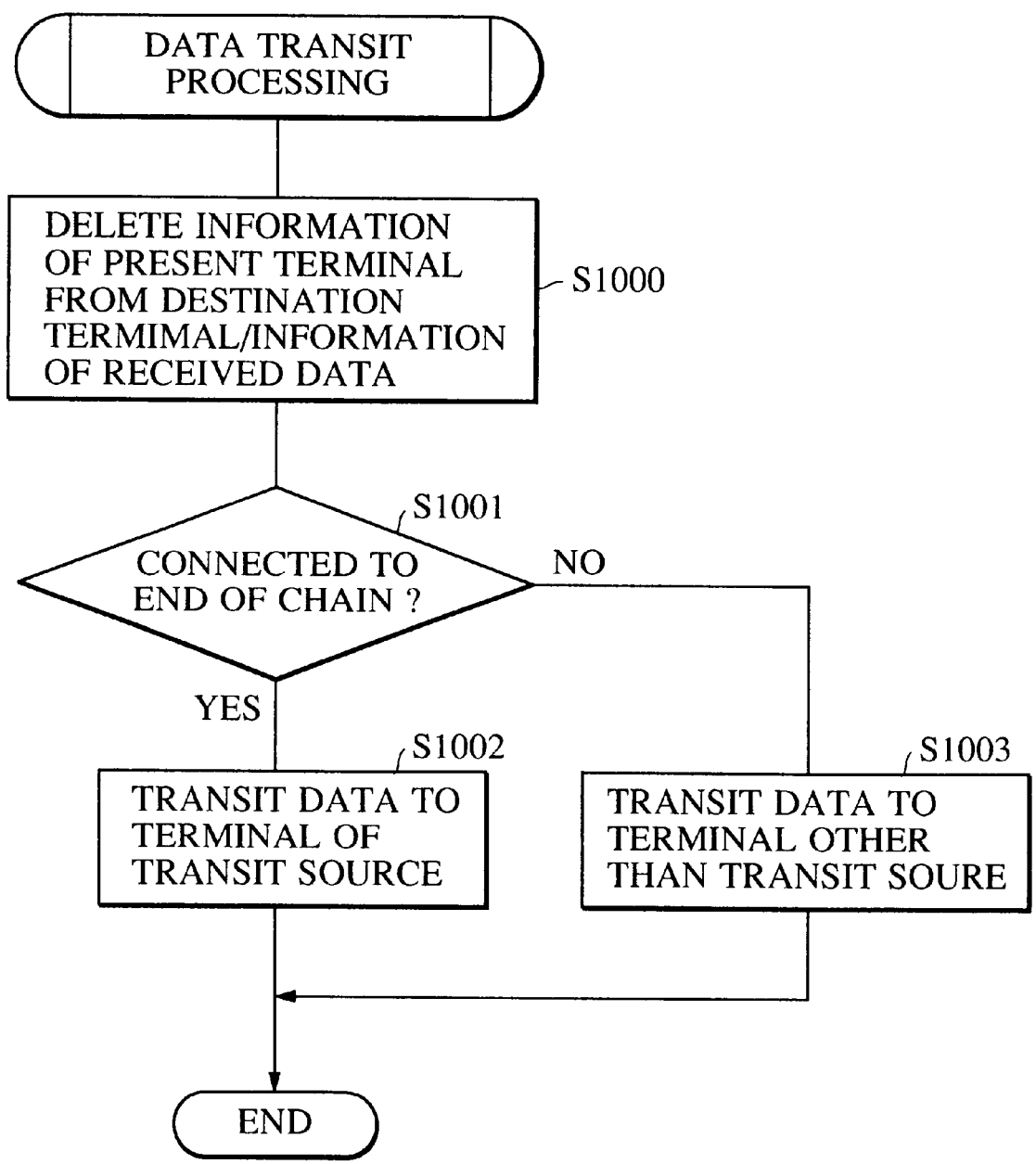
FIG. 19 is a flowchart of an example of data transit processing in inter-station communication in accordance with the second embodiment.

FIG. 19 is a flowchart of an example of data transit processing in the communication terminal of the second embodiment.

In Step S1000, information relating to the present terminal is deleted from destination terminal information set in the control section of the above-described inter-station data.

Figure 13:
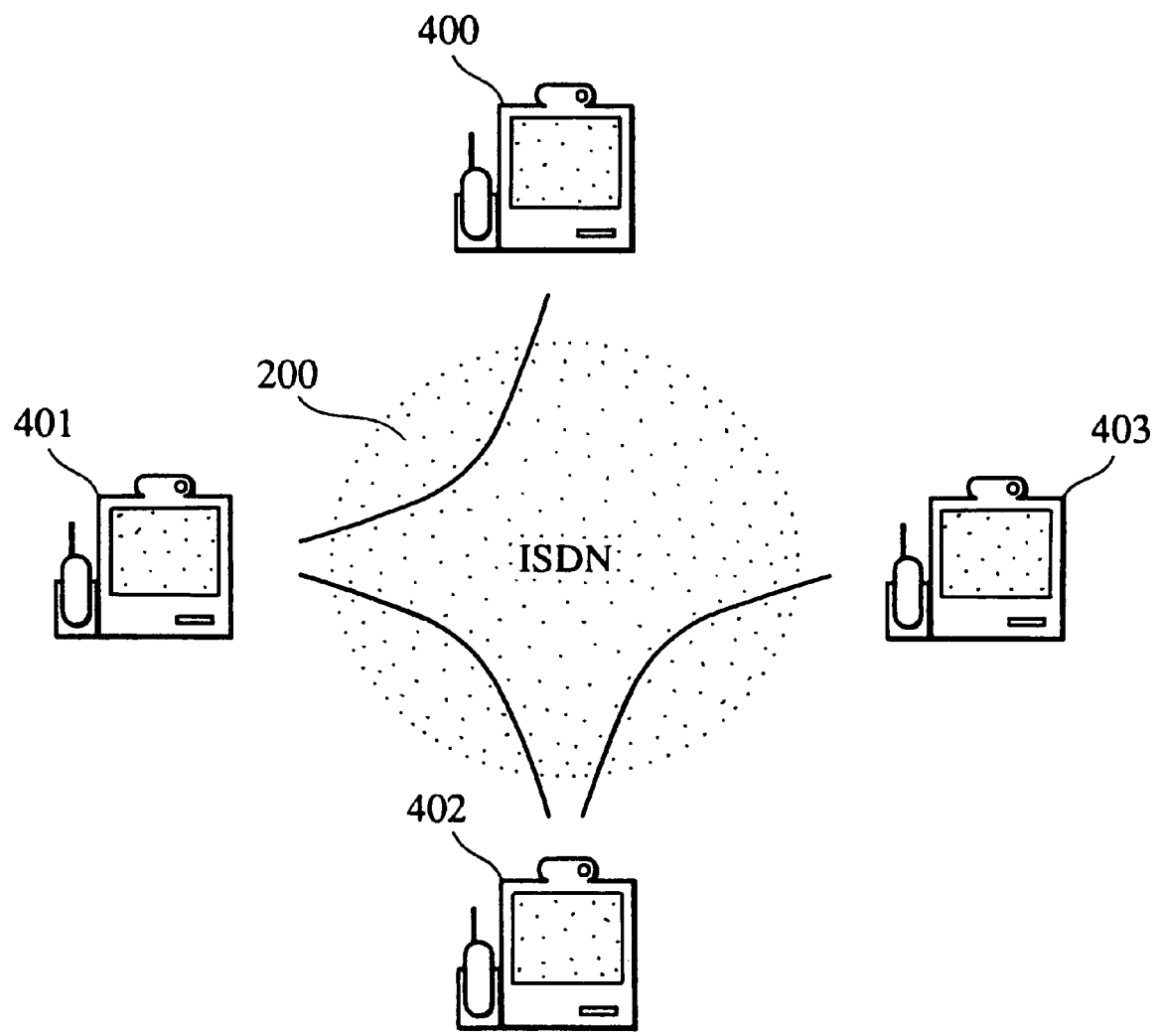
FIG. 13 is a diagram of an example of a multi-station connection form (chain) using no micro control unit.

In Step S1001, determination is made on the basis of the information generated and stored in RAM 102 when the communication circuit is established or when a terminal newly takes part in the communication, i.e., the information indicating the connected form of the communication terminals, as to whether the present communication terminal is located at an end of the multi-station connection in the form of a chain as in the case of the communication terminal 400 or 403 shown in FIG. 13. If the present terminal is located at an end, the process advances to Step S1002. If the present terminal is not located at an end, the process advances to Step S1003.

In Step S1002, the received inter-station data is sent back to the transit source of the inter-section data (for example, communication terminal 401 if the present communication terminal is communication terminal 400 shown in FIG. 13.

In Step S1003, the received inter-station data is transmitted to the communication terminal different from the transit source of the inter-section data (for example, to communication terminal 402 if the present communication terminal is communication terminal 401 shown in FIG. 13, and if the inter-station data has been transferred from communication terminal 400.

The above-described arrangement makes it possible to achieve efficient data transfer no matter what the terminal connection form may be.

The second embodiment has been described with respect to a case where the ISDN basic interface is used. The communication terminal of this embodiment, however, can also be applied to the primary group interface of the ISDN in the same manner.

In the above-described embodiment, inter-station data can be discarded when it is transit-transferred to the communication terminal designated as a destination of the inter-station data, thereby reliably preventing occurrence of an undesirable situation where the inter-station data is endlessly circulated or a situation where the present terminal is obliged to discard the data when the data completes a round through the circuit. Thus, it is possible to avoid inefficient data transfer.

It is also possible to receive inter-station data from a plurality of inter-station communication terminals in parallel efficiently and reliably.

Further, it is possible to efficiently transfer inter-station data irrespective of the form of the inter-station connection, e.g., loop and chain forms.

Further, it is possible to prevent endless circulation of inter-station data through inter-station communication terminals even if incorrect destination information is set.

The embodiments of the present invention have been described with respect to TV conference by way of example. However, it is apparent that the present invention can also be applied to any other kind of communication, e.g. computer multimedia communication.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structure and functions.

What is claimed is:

1. A method for transmitting data through a communication channel to a plurality of terminals, said method comprising the steps of:

receiving the data by a first terminal;

deleting a portion of the received data, including data which was generated by a second terminal, other than the first terminal, to which the first terminal transmits only directly, to leave a remaining portion of the received data;

after said deleting step, adding new data, generated by the first terminal, to the remaining portion to replace the portion of data deleted in said deleting step and thereby form transmission data; and after said adding step, transmitting the transmission data formed in said adding step to the second terminal.

2. A method according to claim 1, wherein said communication channel is formed of a communication circuit connecting the plurality of terminals in the form of a loop.

3. A method according to claim 1, wherein said communication channel is formed of a communication medium connecting the plurality of terminals in the form of a chain and having two communication circuits.

4. A communication system for communicating data through a communication channel to a plurality of terminals, comprising:

said plurality of terminals, wherein a first one of said terminals includes:

receiving means for receiving the data;

information changing means for replacing, in data received by said receiving means, only that portion of the data received by said receiving means which was generated by a second one of said plurality of terminals, other than said first terminal, to which said first terminal communicates only directly, with new data generated by said first terminal to form data to be transmitted; and transmission means for transmitting the data formed in said information changing means to said second terminal, said transmission means transmitting the data formed in said information changing means only after said information changing means has replaced the portion of data with the new data, wherein each of said plurality of terminals other than said first terminal includes receiving means, information changing means and transmission means for performing functions corresponding to the functions of said receiving means, information changing means and transmission means of said first terminal.

5. A communication system according to claim 4, wherein said information changing means comprises deletion means for deleting, from the data received by said receiving means, the portion of the data generated by said second terminal to which the data is to be directly transmitted from said first terminal, and addition means for adding the new data generated by said first terminal to an output from said deletion means.

6. A communication system according to claim 4, wherein said information changing means replaces, in the data received by said receiving means, the portion of the data generated by said second terminal to which the data is to be directly transmitted from said first terminal with the new data generated by said first terminal.

7. A communication system according to claim 4, wherein the data has a multiplexed frame structure in which data generated by the plurality of terminals is multiplexed.

8. A communication system according to claim 7, wherein said multiplexed frame structure includes information for discrimination of at least one of said terminals from which data has been supplied to a data field of said multiplexed structure.

9. A communication system according to any one of claims 4 to 8, wherein the communication data includes data for TV conference.

10. A first terminal apparatus in a communication system which consists of a network connected to a plurality of terminal apparatuses, said first terminal apparatus comprising:

receiving means for receiving data;

information changing means for replacing, in data received by said receiving means, only that portion of the data received by said receiving means which was generated by a second terminal apparatus, which is other than said first terminal apparatus and is one of the plurality of apparatuses, to which said first terminal apparatus communicates only directly, with new data generated by said first terminal apparatus to form data to be transmitted; and transmission means for transmitting the data formed in said information changing means to the second terminal apparatus, said transmission means transmitting the data formed in said information changing means only after said information changing means has replaced the portion of data with the new data, wherein each of the plurality of terminal apparatuses includes receiving means, information changing means and transmission means for performing functions corresponding to the functions of said receiving means, information changing means and transmission means of said first terminal apparatus.

11. A first terminal apparatus according to claim 10, wherein said information changing means comprises deletion means for deleting, from the data received by said receiving means, the portion of the data generated by the second terminal apparatus, and addition means for adding the new data generated by said first terminal apparatus to an output from said deletion means.

12. A first terminal apparatus according to claim 10, wherein said information changing means replaces, in the data received by said receiving means, the data generated by the second terminal apparatus with the new data generated by said first terminal apparatus.

13. A first terminal apparatus according to claim 10, wherein the data has a multiplexed frame structure in which data generated by said first terminal and other terminals is multiplexed.

14. A first terminal apparatus according to claim 13, wherein said multiplexed frame structure includes information for discrimination of at least one of the terminals from which data has been supplied to a data field of said multiplexed frame structure.

15. A first terminal apparatus according to any one of claims 10 to 14, wherein the data includes data for TV conference.

* * * * *

UNITED STATES PATENT AND TRADEMARK OFFICE
CERTIFICATE OF CORRECTION

PATENT NO. : 5,959,978

DATED : September 28, 1999

INVENTOR(S) : HIROKI HORIKOSHI ET AL.  Page 1 of 3

It is certified that error appears in the above-identified patent and that said Letters Patent is hereby corrected as shown below:

In the drawings,

SHEET 2

Figure 1B, "INFOUMATION" (both occurrences) should
    read --INFORMATION--.

SHEET 18

Figure 18, "SEPATATION" should read --SEPARATION--.

SHEET 19

Figure 19, "TERMIMAL/INFORMATION" should read
    --TERMINAL/INFORMATION--; and "TRANSIT DATA"
    (both occurrences) should read --TRANSMIT DATA--; and
    "SOURE" should read --SOURCE--.

COLUMN 1

Line 14, "widely been" should read --been widely--.
  Line 18, "conferences" should read --conference--.
  Line 20, "conferences" should read --conference--.

UNITED STATES PATENT AND TRADEMARK OFFICE
CERTIFICATE OF CORRECTION

PATENT NO. : 5,959,978

DATED : September 28, 1999

INVENTOR(S) : HIROKI HORIKOSHI ET AL.

It is certified that error appears in the above-identified patent and that said Letters Patent is hereby corrected as shown below:

COLUMN 2

Line 39, "a essential" should read --an essential--.

COLUMN 3

Line 22, "EMBODIMENT" should read --EMBODIMENTS--.

COLUMN 4

Line 38, "below 38." should read --below.--.

COLUMN 5

Line 63, "406" should read --306--.
   Line 65, "included" should read --included in--.

COLUMN 11

Line 48, "respects" should read --respect--.

UNITED STATES PATENT AND TRADEMARK OFFICE
CERTIFICATE OF CORRECTION

PATENT NO. : 5,959,978

DATED : September 28, 1999

INVENTOR(S) : HIROKI HORIKOSHI ET AL.

It is certified that error appears in the above-identified patent and that said Letters Patent is hereby corrected as shown below:

COLUMN 12

Line 25, "terminal 505" should read --terminal information 505--.

COLUMN 13

Line 28, "above-descried" should read --above-described--.

COLUMN 14

Line 43, "FIG. 13." should read --FIG. 13).--.
Line 50, "terminal 400," should read --terminal 400).--.

COLUMN 15

Line 22, "structure" should read --structures--.

Signed and Sealed this

Eighteenth Day of July, 2000

Attest:

Q. TODD DICKINSON

*Attesting Officer*   *Director of Patents and Trademarks*